US009835457B2

(12) United States Patent
Morris

(10) Patent No.: US 9,835,457 B2
(45) Date of Patent: Dec. 5, 2017

(54) ROCK CLIMBING NAVIGATIONAL WATCH

(71) Applicant: Garmin Switzerland GmbH, Schaffhausen (CH)

(72) Inventor: Mark D. Morris, Cary, NC (US)

(73) Assignee: Garmin Switzerland GmbH (CH)

( * ) Notice: Subject to any disclaimer, the term of this patent is extended or adjusted under 35 U.S.C. 154(b) by 299 days.

(21) Appl. No.: 14/812,863

(22) Filed: Jul. 29, 2015

(65) Prior Publication Data
US 2016/0299230 A1 Oct. 13, 2016

Related U.S. Application Data

(60) Provisional application No. 62/143,947, filed on Apr. 7, 2015.

(51) Int. Cl.
*G01C 21/20* (2006.01)
*G01C 21/32* (2006.01)
*G01S 19/19* (2010.01)
*G06F 17/30* (2006.01)
*G06T 19/00* (2011.01)

(52) U.S. Cl.
CPC ............ *G01C 21/20* (2013.01); *G01C 21/32* (2013.01); *G01S 19/19* (2013.01); *G06F 17/30241* (2013.01); *G06T 19/003* (2013.01)

(58) Field of Classification Search
CPC ......... G01C 21/20; G01C 21/32; G01S 19/19; G06F 17/30241; G06T 19/003
See application file for complete search history.

(56) References Cited

U.S. PATENT DOCUMENTS

| 5,790,477 A * | 8/1998 | Hauke | G01C 21/20 368/10 |
| 8,504,285 B2 * | 8/2013 | Vepsalainen | G01C 21/3453 701/410 |
| 8,701,840 B2 * | 4/2014 | Allen | A62B 1/14 182/5 |

(Continued)

OTHER PUBLICATIONS

Printout from http://www.mountainproject.com/destinations/, published prior to Jul. 29, 2015.

(Continued)

*Primary Examiner* — Russell Frejd
(74) *Attorney, Agent, or Firm* — Samuel M. Korte; Max M. Ali

(57) ABSTRACT

Embodiments are disclosed to calculate and store rock climbing navigational data using a rock climbing watch including a sensor array configured to measure an orientation of the rock climbing watch and a processor configured to calculate an angle between two rock face locations along a rock climbing route based upon an orientation of the rock climbing watch when it is pointed from a current rock face location towards another rock face location. A processor may determine route segments for traversing the rock climbing route. A processor may convert route climbing navigational data into a three-dimensional wireframe rock climbing navigational map including rock face locations, calculated distances and angles between rock face locations, and a rock climbing route. The rock climbing watch may present information to guide the user along a rock climbing route by displaying a graphical directional indicator and a distance to the next rock face location.

20 Claims, 5 Drawing Sheets

(56) References Cited

U.S. PATENT DOCUMENTS

2012/0190386 A1* 7/2012 Anderson .............. G01C 15/04
　　　　　　　　　　　　　　　　　　　　455/456.3
2014/0107816 A1* 4/2014 Guedalia ............. G06F 19/3481
　　　　　　　　　　　　　　　　　　　　700/91
2014/0228649 A1* 8/2014 Rayner ................ A61B 5/1118
　　　　　　　　　　　　　　　　　　　　600/301

OTHER PUBLICATIONS

Printout from http://www.gosoftworks.com/GoSkyWatch/GoSkyWatch.html , published prior to Jul. 29, 2015.
Printout from http://www.bosch-sensortec.com/en/homepage/products_3/9_axis_sensors_5/ecompass_2/bno055_3/bno055_4 , published prior to Jul. 29, 2015.

* cited by examiner

ROCK CLIMBING NAVIGATIONAL WATCH

CROSS-REFERENCE TO RELATED APPLICATIONS

The priority benefit of U.S. Provisional Patent Application No. 62/143,947, entitled "Rock Climbing Smart Watch, Mobile, and Cloud Ecosystem," filed on Apr. 7, 2015, is claimed and the disclosure of which is hereby incorporated by reference in its entirety.

BACKGROUND

The present disclosure relates generally to a rock climbing navigational watch and, more particularly, to a watch that guides climbers ascend or descend a rock face along one or more rock climbing routes that may be used by others as a rock climbing navigational aid. A rock climbing route may include one or more rock face locations. A rock face location may include preexisting bolt locations (sport climbing) and/or trad anchor locations selected by the climber while climbing (traditional climbing). These rock face locations are commonly referred to as, "anchor locations" in the art.

Before embarking on a rock climbing endeavor, a rock climber may search for information, such as the location and difficulty level associated with a rock climb. Although information associated with a rock climb that may be followed by others may be found in materials relating to rock climbing, these materials may not be published frequently enough to include the most recent data associated with a climb, may not inform a user of more precise details associated with a rock climb such as suggested routes for use when navigating a specific rock face, and the materials may provide limited information relating to the shape of the rock and the difficulty rating system. Although rock climbing materials available on the Internet may provide more up-to-date information about a rock climb, online sources do not typically provide customized suggestions relating to the user or the rock face.

Although devices having global positioning systems (GPS) functionality may be used to navigate a user through roads and hiking trails to find a destination, such as a rock face location (e.g., base location or peak location), such devices provide limited features for aiding a user while climbing the rock face along a rock climbing route. Devices that utilize GPS functionality in areas with at least partially obstructed reception of GPS signals, such as areas having many rock surfaces (e.g., gorge, canyon, cliff, etc.) or trees above the user, typically encounter performance and/or accuracy challenges to determine a current position for the device. As a result, the current techniques of determining, storing and providing information associated with a rock climbing route for a rock face are inadequate.

SUMMARY

Embodiments are disclosed directed to rock climbing navigation. In one embodiment, a rock climbing watch is described that determines a geographic location of the rock climbing watch, measures an orientation of the rock climbing watch, calculates one or more angles between rock face locations as the user climbs the rock face, and stores this data as rock climbing navigational data. For instance, the rock climbing watch may calculate a first angle between a starting location and a first rock face location based upon the orientation of the rock climbing watch when the rock climbing watch is pointed from the starting location towards the first rock face location and store the first angle as rock climbing navigational data. The rock climbing watch may also calculate a second angle between the first rock face location and a second rock face location based upon the orientation of the rock climbing watch when the rock climbing watch is pointed from the first rock face location towards the second rock face location and store the second angle as rock climbing navigational data. In embodiments, the rock climbing watch may calculate a first distance between the starting location and the first rock face location based upon the first angle and a change in elevation of the rock climbing watch between the starting location and the first rock face location. The rock climbing watch may also calculate a second distance between the first rock face location and the second rock face location based upon the second angle and a change in elevation of the rock climbing watch between the first rock face location and the second rock face location. The rock climbing watch may store the first and the second distances as rock climbing navigational data.

In embodiments, a processor of the rock climbing watch may receive a user input from a user interface, a hands-free gesture, or metal detection of an object such as a bolt, indicating that the user has arrived at a rock face location. By storing the location of bolts, calculated angles between bolts, calculated distances between bolts, and/or measured sensor metrics, the rock climbing watch may store rock climbing navigational data may include rock climbing route segments extending between rock face locations. The rock climbing navigational data may be used by other climbers as a guide when traversing the same rock face.

In embodiments, the rock climbing watch may determine a difference between rock climbing navigational data, which may include an angle and/or a distance between rock face locations along a rock climbing route, calculated while the user traverses a rock climbing route and stored rock climbing navigational data. A processor may store in memory an indication that the calculated angle and/or distance is accurate if the determined difference is below an error threshold to determine whether the rock climbing navigational data is accurate. The processor may store in memory an indication that the calculated angle and/or distance is inaccurate if the determined difference exceeds an error threshold.

In embodiments, a processor may convert the route climbing navigational data into a three-dimensional rock climbing navigational map including rock face locations, calculated distances and angles between the rock face locations, and a rock climbing route between rock face locations. The rock climbing navigational map may be presented as a wireframe map, which may be rotated in all three dimensions, that accurately represents the path of the climbing route along the surface of the rock face.

In embodiments, users may initiate a climb using the rock climbing navigational data to aid with navigating a rock climbing route on a rock face associated with the rock climbing navigational data. As the climber reaches a starting location, which may be any rock face location (e.g., a base location, a peak location, or an intermediate location therebetween), the rock climbing watch may present information to guide the user from the current rock face location to the next rock face location along a rock climbing route by displaying a graphical directional indicator (e.g., arrow, text, etc.) and a distance to the next rock face location. An identifier, such as a number or name, associated with the next anchor location may also be presented.

In still other embodiments, the rock climbing navigational data and/or the three-dimensional wireframe rock climbing navigational map may be communicated to one or more servers that may be accessed by a plurality of other rock climbers. The servers may aggregate or combine the received information to create a single set of route climbing navigational data and/or a single three-dimensional rock climbing navigational map. Other users may access the servers to download the rock climbing navigational data and/or three-dimensional rock climbing navigational map to their own rock climbing watches for utilization while climbing a rock face. The rock climbing navigational data may be communicated to a server accessed by a plurality of other rock climbers after a climb has been completed or as the climb is taking place to facilitate real-time tracking of progress and the location of the user. In accordance with such embodiments, climbers may create respective user profiles and store their own recorded, or tagged, rock climbing navigational data. In addition to the rock climbing navigational data, the user profiles may include information that may be valuable for other climbers, such as a user skill level, a user difficulty rating for a rock face associated with rock climbing navigational data, and a description of the rock climbing navigational data.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, whenever possible, the following description refers to the reference numerals included in the following figures, in which features depicted in multiple figures are designated with consistent reference numerals.

DETAILED DESCRIPTION

The following text sets forth a detailed description of numerous different embodiments. However, it should be understood that the detailed description is to be construed as exemplary only and does not describe every possible embodiment since describing every possible embodiment would be impractical. In light of the teachings and disclosures herein, numerous alternative embodiments may be implemented.

It should be understood that, unless a term is expressly defined in this patent application using the sentence "As used herein, the term '_____' is hereby defined to mean . . . " or a similar sentence, there is no intent to limit the meaning of that term, either expressly or by implication, beyond its plain or ordinary meaning, and such term should not be construed to be limited in scope based on any statement made in any section of this patent application.

Figure 1:
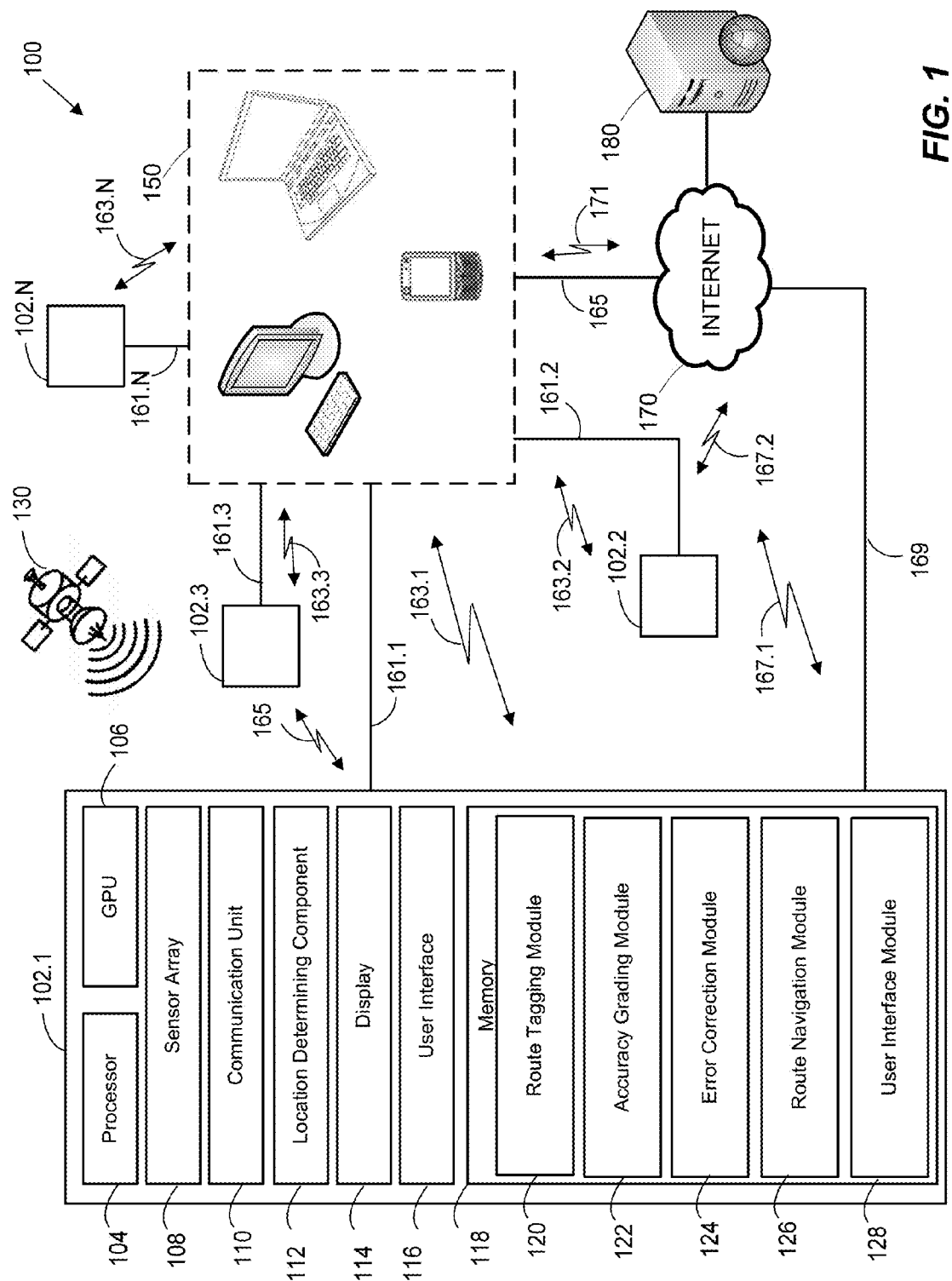
FIG. 1 is an illustration of a block diagram of an exemplary rock climbing navigation system 100 in accordance with an embodiment of the present disclosure.

FIG. 1 is an illustration of a block diagram of an exemplary rock climbing navigation system 100 in accordance with an embodiment of the present disclosure. Rock climbing navigation system 100 includes N number of rock climbing watches 102.1-102.N, one or more external computing devices 150, and a backend computing device 180. Due to the location and shape of various rock faces, location determining component 112 may not be able to determine a current geographic location of the rock climbing watch 102.1 at all locations on the rock face. Additionally, because a user's hands are frequently unavailable to make inputs while climbing a rock face, techniques that enable hands-free collection of rock climbing navigational data are helpful to all rock climbers.

Communications between one or more of rock climbing watches 102.1-102.N, one or more external computing devices 150, and/or one or more backend computing devices 180 may facilitate the transfer of any suitable number and/or type of data between these devices. For example, the data may include one or more rock climbing navigational datas, one or more indicators of the accuracy of one or more portions thereof (further discussed below) a user name, data identifying the location and/or name of the rock in which the rock climbing navigational data pertains, a difficulty rating, etc.

In an embodiment, one or more rock climbing watches 102.1-102.N may be configured to communicate with one another using any suitable number of wired and/or wireless links (e.g., wireless link 163) via any suitable number and/or type of communication protocols. Additionally or alternatively, one or more rock climbing watches 102.1-102.N may be configured to communicate with one or more external computing devices 150 and/or backend computing device 180 using any suitable number of wired and/or wireless links (e.g., wireless links 163.1-163.N, wired links 161.1-161.N, wireless links 167.1-167.2 via Internet 170, wired link 169 via Internet 170, etc.) via any suitable number and type of communication protocols.

In an embodiment, one or more of external computing devices 150 may include any suitable number and/or type of computing devices configured to facilitate user interaction and data exchange with one or more rock climbing watches 102.1-102.N. For example, one or more of external computing devices 150 may be implemented as a mobile computing device (e.g., a smartphone, tablet, laptop, phablet, netbook, notebook, pager, personal digital assistant (PDA), wearable computing device, smart glasses, a smart watch or a bracelet, etc.), or other suitable type of computing device capable of wired and/or wireless communication (e.g., a desktop computer).

In an embodiment, one or more of external computing devices 150 may facilitate a connection to the Internet 170. In accordance with such an embodiment, one or more of external computing devices 150 may communicate with backend computing device 180 via communications with the Internet 170, which may implement any suitable number and type of communication protocols (e.g., via wireless link 171 and/or wired link 165).

In an embodiment, one or more rock climbing watches 102.1-102.N may communicate stored rock climbing navigational data determined or calculated during a rock climb after the rock climbing activity has been completed. The rock climbing navigational data may be uploaded or shared with other climbers by communicating or otherwise transferring the rock climbing navigational data to one or more external computing devices 150 and to one or more backend computing devices 180 accessible by the other climbers.

Route climbing navigational data may be presented as a three-dimensional wireframe rock climbing navigational map including rock face locations and calculated distances and angles between the rock face locations. The rock climbing navigational data may be used by other climbers as a guide when traversing the same rock face. In various embodiments, one or more of rock climbing watches 102.1-102.N may automatically store, share or upload rock climbing navigational data upon completion of rock climbing activities. For example, rock climbing watches 102.1-102.N may automatically determine using location determining component 112, or a user may indicate via user interface 116, that the top (peak) location or the base location has been reached completing the climb. The rock climbing watches 102.1-102.N may, upon completion of the climb, automatically store, share or upload stored rock climbing navigational data to one or more external computing devices 150 and to one or more backend computing devices 180 accessible by the other climbers.

Additionally or alternatively, rock climbing watches 102.1-102.N may incrementally store, upload or share rock climbing navigational data as portions of a rock climb are completed, which may occur automatically upon receipt of one or more suitable inputs. For example, calculated angles and distances between rock face locations may be communicated at each rock face location once the user completes the appropriate pointing gestures or otherwise provides the appropriate inputs that are discussed below.

In some embodiments, the rock climbing navigational data may be transferred from one or more of rock climbing watches 102.1-102.N to backend computing device 180 via communications using communication unit 110 in accordance with any suitable number and type of communication protocols. Communications between one or more of rock climbing watches 102.1-102.N and one or more backend computing devices 180 may occur independently of communications between one or more of rock climbing watches 102.1-102.N and one or more external computing devices 150. In accordance with embodiments whereby one or more rock climbing watches 102.1-102.N communicate with one or more backend computing devices 180 to upload rock climbing navigational data, these communications may occur after a rock climb has been completed.

Rock climbing navigational data may include known and/or estimated locations of rock face locations on a rock face, calculated angles between rock face locations, calculated distances between rock face locations, changes in elevation between rock face locations, geographic locations of a base location, intermediate location and/or rock face location at the top of the rock face, identifiers associated with a rock face location (e.g., number or name for rock face location), rock climbing route segments extending between rock face locations, known and/or estimated geographic location of the rock climbing watch at various positions along the rock climbing route. In embodiments, the rock climbing navigational data may be presented as a three-dimensional wireframe rock climbing navigational map including the abovementioned information associated with a rock face.

Any portion of the rock climbing navigational data may be communicated to one or more backend computing devices 180 while the user is climbing the rock face. In this way, real-time (or near real-time) information regarding the user's location or rock climbing progress may be made communicated to others via one or more backend computing devices 180, such as through a social media platform, for example. In embodiments, the rock climbing navigational data may be transferred from one or more of rock climbing watches 102.1-102.N to one or more backend computing devices 180 by first transferring the rock climbing navigational datas to one or more external computing devices 150 in accordance with any suitable number and/or type of communication protocols (e.g., via wired links 161.1-161.N and/or wireless links 163.1-163.N) and then transferring the rock climbing navigational datas from the one or more external computing devices 150 to one or more backend computing devices 180 via the Internet 170 (e.g., via wireless link 171 and/or wired link 165).

Backend computing device 180 may be implemented as any suitable number, type, and/or combination of computing devices configured to perform functions in accordance with the embodiments described herein. For example, backend computing device 180 may be configured as one or more database servers, one or more web servers, any suitable combination thereof, etc. In an embodiment, backend computing device 180 may be configured to execute one or more applications, algorithms, programs, etc., to facilitate the storage and/or retrieval of one or more user profiles, each of which may include rock climbing navigational data and/or associated information uploaded by one or more users. Backend computing device 180 may be configured to support one or more web-based applications, manage one or more publicly or privately accessible online storage systems to support one or more social media applications, etc. These embodiments are further discussed below.

Rock climbing watch 102.1, which is one of rock climbing watches 102.1-102.N, is shown in further detail in FIG. 1. Rock climbing watch 102.1 may be implemented as any suitable type of wearable device configured to perform the functions in accordance with the embodiments described herein. In an embodiment, rock climbing watch 102.1 may be configured as a watch worn by a user, such as a rock climber, for example. The rock climbing watch 102.1 may include a processor 104, a graphics processing unit 106, a sensor array 108, a communication unit 110, a location determining component 112, a display 114, a user interface 116, and a memory 118. Rock climbing watch 102.1 may include additional or fewer elements than those illustrated in FIG. 1 known to those skilled in the art. For example, a power source, ports, interconnects, etc., are not shown in FIG. 1 or further described herein for purposes of brevity. Furthermore, although illustrated as separate elements, any suitable combination of elements shown in FIG. 1 that form one or more portions of rock climbing watch 102.1 may be integrated as part of a single processor 104 or element thereof.

The rock climbing watch 102.1 may include a sensor array 108. The sensor array 108 may be implemented as any suitable number and/or type of sensors configured to measure, detect, monitor, and/or quantify one or more physical characteristics and/or to generate sensor data based upon one or more physical characteristics. Sensor array 108 may be advantageously mounted or otherwise positioned within rock climbing watch 102.1 to facilitate these functions. Sensor array 108 may be configured to sample and/or to generate sensor data continuously and/or in accordance with any suitable sampling rate, such as once per every 5 seconds, once per every 10 seconds, once per every 30 seconds, etc. In embodiments, sensor array 108 may facilitate the determination of a change in elevation of rock climbing watch 102.1. To provide another example, sensor array 108 may facilitate the determination of whether the motion of rock climbing watch 102.1 matches a predetermined motion profile. The application and utilization of this type of sensory data is further discussed below.

Examples of suitable sensor types implemented by sensor array 108 may include one or more accelerometers, gyroscopes, perspiration detectors, compasses, speedometers, magnetometers, barometers, barometric altimeters, thermometers, proximity sensors, light sensors, Hall Effect sensors, electromagnetic radiation sensors (e.g., infrared and/or ultraviolet radiation sensors), humistors, hygrometers, altimeters, biometrics sensors (e.g., heart rate monitors, blood pressure monitors, skin temperature monitors), microphones, etc.

Communication unit 110 may be configured to support any suitable number and/or type of communication protocols to facilitate communications between rock climbing watch 102.1, one or more other rock climbing watches 102.2-102.N, one or more of external computing devices 150, and/or one or more backend computing devices 180. Communication unit 110 may be implemented with any suitable combination of hardware and software to facilitate this functionality. For example, communication unit 110 may be implemented with any number of wired and/or wireless transceivers, ports, connectors, etc.

Communication unit 110 may be configured to facilitate communications with various devices 150 using different types of communication protocols. For example, communication unit 110 may facilitate peer-to-peer mode communications between rock climbing watch 102.1 and via an IEEE 802.11 protocol such as Wi-Fi direct, for example (e.g., via wireless links 163.1-163.N). To provide another example, communication unit 110 may facilitate communications between rock climbing watch 102.1 and one or more of external computing devices 150 via a wireless BLUETOOTH communication protocol (e.g., via wireless link 163.1) and/or via a wired universal serial bus (USB) protocol (e.g., via wired link 161.1.) To provide yet another example, communication unit 110 may facilitate communications between rock climbing watch 102.1 and backend computing device 180 via a wireless cellular communication protocol (e.g., via wireless link 167.1).

Location determining component 112 may be a satellite navigation receiver that works with a global navigation satellite system (GNSS) such as the global positioning system (GPS) primarily used in the United States, the GLONASS system primarily used in the Soviet Union, the BeiDou system primarily used in China, or the Galileo system primarily used in Europe. The GNSS includes a plurality of satellites in orbit about the Earth. The orbit of each satellite 130 is not necessarily synchronous with the orbits of other satellites and, in fact, is likely asynchronous. A GNSS equipped device such as the rock climbing watch 102.1 is shown receiving spread spectrum satellite signals from the various satellites 130. The spread spectrum signals continuously transmitted from each satellite use a highly accurate frequency standard accomplished with an extremely accurate atomic clock. Each satellite 130, as part of its data signal transmission, transmits a data stream indicative of that particular satellite. The rock climbing watch 102.1 must acquire spread spectrum satellite signals from at least three satellites for the receiver device to calculate its two-dimensional position by triangulation. Acquisition of an additional signal, resulting in signals from a total of four satellites, permits the rock climbing watch 102.1 to calculate its three-dimensional position.

The location determining component 112 and the processor 104 are operable to receive navigational signals from the satellites 130 and to calculate positions of the rock climbing watch 102.1 as a function of the signals. The location determining component 112 and processor 104 may also determine track logs or any other series of geographic coordinates corresponding to points along a rock face or other path traveled by a user of the rock climbing watch 102.1. The location determining component 112 and/or the processor 104 may also be operable to calculate routes to desired locations, provide instructions to navigate to the desired locations, display maps and other information on the display screen, and to execute other functions described herein.

The location determining component 112 may include one or more processors, controllers, or other computing devices and memory so that it may calculate location and other geographic information without the processor 104 or it may utilize the components of the processor 104. Further, the location determining component 112 may be integral with the processor 104 such that the location determining component 112 may be operable to specifically perform the various functions described herein. Thus, the processor 104 and location determining component 112 can be combined or be separate or otherwise discrete elements.

The location determining component 112 may include an antenna to assist in receiving the satellite signals. The antenna may be a patch antenna, a linear antenna, or any other type of antenna that can be used with navigational devices. The antenna may be mounted directly on or in the housing or may be mounted external to the housing.

Although embodiments of the rock climbing watch 102.1 may include a satellite navigation receiver, it will be appreciated that other location-determining technology may be used. For example, the communication unit 110 may be used to determine the location of the rock climbing watch 102.1 by receiving data from at least three transmitting locations and then performing basic triangulation calculations to determine the relative position of the device with respect to the transmitting locations. For example, cellular towers or any customized transmitting radio frequency towers can be used instead of satellites. With such a configuration, any standard geometric triangulation algorithm can be used to determine the location of the rock climbing watch 102.1.

In other embodiments, the location determining component 112 need not directly determine the current geographic location of the rock climbing watch 102.1. For instance, the location determining component 112 may determine the current geographic location through a communications network, such as by using Assisted Global Positioning System (A-GPS) by receiving communications from a combination of base stations and/or satellites, or from another electronic device. The location determining component 112 may even receive location data directly from a user. For example, a user may obtain location data for a rock climb before and after it has been climbed from another satellite navigation receiver or from another source and then manually input the data into the rock climbing device 102.1.

Display 114 may be implemented as any suitable type of display, and may be configured to facilitate user interaction. For example, display 114 may be implemented as a capacitive touch screen display, a resistive touch screen display, etc. In various aspects, display 114 may be configured to work in conjunction with user interface 116 and/or user interface module 128, processor 104, and/or GPU 106 to detect user inputs upon a user selecting a displayed interactive icon, menu option, graphic, to identify user selections of objects displayed via display 118, etc.

User interface 116 may be configured to facilitate user interaction with rock climbing watch 102.1. For example, user interface 116 may include one or more user-input devices such as an interactive portion of display 114 (e.g., a menu displayed on display 114), one or more buttons, crowns, knobs, switches, etc. User interface 116 may detect user interactions with rock climbing watch 102.1 such as button presses, a user twisting and/or pressing a crown, etc.

In an embodiment, the user's interaction with rock climbing watch 102.1 via user interface 116 may result in processor 104 detecting one or more inputs and/or commands. Rock climbing watch 102.1 may perform various acts upon receipt of these input or commands, which are further discussed below.

Figure 2:
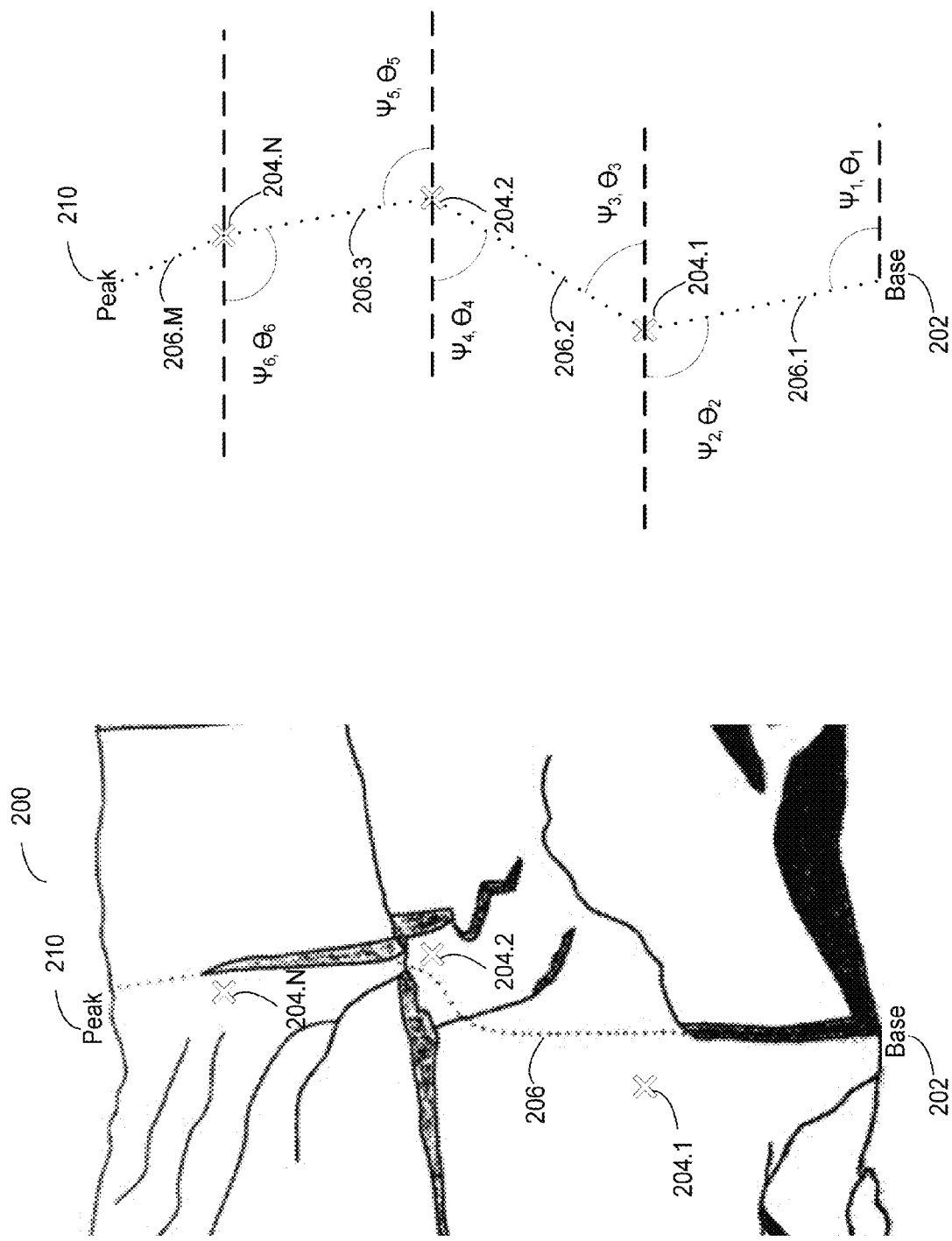
FIG. 2 is an illustration of a rock face 200 in accordance with an embodiment of the present disclosure.

FIG. 2 is an illustration of a rock face 200 in accordance with an embodiment of the present disclosure. In various embodiments, rock climbing watch 102.1 may allow a user to tag one or more anchor locations that form a rock climbing route while ascending and/or descending a rock face, such as rock face 200, for example. The rock climbing route may include a number of rock climbing segments represented by the relatively short rock climbing route between each two adjacent anchor locations. The length and position of each of the rock climbing segments with respect to one another, the angles between them, and the rock base and rock peak locations, form rock climbing navigational data.

In other embodiments, rock climbing watch 102.1 may allow a user to ascend and/or descend a rock face, such as rock face 200, for example, using another user's previously generated rock climbing navigational data.

The following description of rock climbing watch 102.1 is provided with reference to rock face 200, as shown in FIG. 2. However, the embodiments described herein may be applicable to any suitable climbing surface in which climbing segments may be utilized.

As shown in FIG. 2, rock face 200 includes a base location 202 at the bottom of a rock climb, a peak location 210 typically associated with an rock face location at the top of a rock climb, intermediate locations 204.1-204.N, and a rock climbing route 206 connecting the base location 202, one or more intermediate locations 204.1-204.N and the peak location 210. Rock climbing route 206 includes M number of rock climbing route segments 206.1-206.M between the base location 202, N number of rock face locations 204.1-204.N, and the peak location 210 of rock face 200. Rock face locations 204.1-204.N may coincide with the locations of preexisting bolts that may be used by climbers engaging in sport climbs. In embodiments, rock face locations 204.1-204.N may also coincide with the locations of traditional climbing gear (e.g., nuts, hexes, cams) accessible to a climber as he traverses rock face 200 in accordance with a traditional climb.

In an embodiment, a climber wearing rock climbing watch 102.1 may begin a new climb of rock face 200 and indicate this via one or more inputs or interactions with display 114 in conjunction with user interface 116. For example, a climber may begin recording rock climbing navigational data associated with a rock climbing route 206 by cycling through one of several options displayed via display 114 and selecting a "route tagging" option. Upon a climber selecting the route tagging option in such a manner, rock climbing watch 102.1 may begin the process of recording rock climbing navigational data associated with a rock climbing route 206, as further described below.

Processor 104 may be configured to communicate and/or operate in conjunction with one or more of GPU 106, sensor array 108, communication unit 110, location determining component 112, display 114, user interface 116, and/or memory 118 to facilitate one or more functions of the embodiments as described herein. Processor 104 and/or GPU 106 may be implemented as any suitable type and/or number of processors, such as a host processor of rock climbing watch 102.1, for example. To provide additional examples, processor 104 and/or GPU 106 may be implemented as an application specific integrated circuit (ASIC), an embedded processor, a central processing unit associated with rock climbing watch 102.1, etc.

Processor 104 and/or GPU 106 may be configured to execute instructions stored in memory 118, to store data to memory 118, and/or to retrieve data from memory 118. In accordance with various embodiments, memory 118 may be a computer-readable non-transitory storage device that may include any suitable combination of volatile (e.g., a random access memory (RAM), or non-volatile memory (e.g., battery-backed RAM, FLASH, etc.).

Memory 118 may be configured to store instructions executable on processor 104 and/or GPU 106, such as the various memory modules illustrated in FIG. 1 and further discussed below. These instructions may include machine readable instructions that, when executed by processor 104 and/or GPU 106, cause processor 104 and/or GPU 106 to perform various acts as described herein. Memory 118 may also be configured to store any other suitable data, such as rock climbing navigational data recorded by a climber using rock climbing watch 102.1, rock climbing navigational data, an error threshold used for comparing calculated angles and distances with stored rock climbing navigational data to determine a difference between these values, rock climbing navigational data downloaded to rock climbing watch 102.1 that have been recorded by the user or other climbers, and data associated with the rock face 200. For instance, data associated with rock face 200 may include accuracy grades, error correction data, etc.

Route tagging module 120 is a portion of memory 118 configured to store instructions that, when executed by processor 104 and/or GPU 106, cause processor 104 and/or GPU 106 to perform various acts in accordance with applicable embodiments as described herein. In an embodiment, route tagging module 120 includes instructions that, when executed by processor 104 and/or GPU 106, cause processor 106 and/or GPU 106 to work in conjunction with one another, with sensor array 108, location determining component 112, and/or user interface 116 to facilitate the recording and/or storing of rock climbing navigational data.

For example, upon receipt of an input via user interface 116 indicating that a new rock climbing route 206 is to be recorded, processor 104 may determine or calculate rock climbing navigational data as the user of rock climbing watch 102.1 begins climbing rock face 200 to create a new rock climbing route 206. Processor 104 may also determine a geographic location of rock climbing watch 102.1 using location determining component 112, a current time, current weather conditions, etc. This data may be stored in memory 118 as part of the rock climbing navigational data.

In embodiments, upon executing instructions stored in route tagging module 120 to begin a new rock climbing route 206, processor 104 may facilitate the calibration of one or more sensors implemented by sensor array 108, which may include a three-axis accelerometer and/or a three-axis magnetometer. In embodiments, sensor array 108 may also include a barometric altimeter. Once the climber indicates that a new rock climbing route is to be recorded, processor 104 may determine an initial reference barometric pressure and associate this with base location 202 to gauge changes in elevation as the climber ascends (or descends) rock face 200, which is further discussed below. Processor 104 may cause GPU 106 to display one or more calibration steps via display 114, which may calibrate one or more sensors upon the user performing each step to calibrate sensor array 108. Before starting the climb of rock face 200, the climber may be prompted by rock climbing watch 102.1 to rotate the watch to a plurality of yaw, pitch, and roll axes one at a time such that a three-axis sensor of sensor array 108 may be suitably calibrated. In embodiments, the climber may be prompted by rock climbing watch 102.1 to input, using user interface 116, a known altitude for the current location to calibrate the barometric altimeter. Processor 104 may also determine a current location using location determining component 112 and determine an altitude for the determined current location using cartographic data stored in memory 118.

Processor 104 may calculate an angle between a current location, such as a first rock face location, and a rock face location of interest by determining, using at least one sensor of sensor array 108, an orientation of the rock climbing watch 102.1 when the rock climbing watch 102.1 is pointed from the current location towards the rock face location of interest. For example, if a user is positioned at a base location 202 and the first rock face location 204.1 is of interest, rock climbing watch 102.1 may prompt the climber (e.g., via display 114) to aim rock climbing watch from base location 202 to rock face anchor 204.1. Such a prompt may be presented on display 114 after the route tagging process has begun (e.g., the climber has selected the appropriate option on rock climbing watch 102.1 and calibrated the relevant sensors) and the user is climbing rock face 200.

In embodiments, rock climbing watch 102.1 may be configured to include on its exterior surface or on display 114 any suitable number and type of sights to facilitate consistent aiming. For example, a sight may be a mark, such as a protrusion, provided on a point of the front surface of the rock climbing watch 102.1. Once the climber has aligned rock climbing watch 102.1 towards rock face location 204.1 using a sight, processor 104 may determine that rock climbing watch 102.1 is being pointed at rock face anchor 204.1. In embodiments, rock climbing watch 102.1 may include a feedback generator to provide feedback to confirm that the orientation of the rock climbing watch 102.1 towards rock face location 102.1 has been maintained for a sufficient period of time to calculate an angle between the base location 202 and the first rock face location 204.1.

In embodiments, as rock climbing watch 102.1 is being pointed at a subsequent rock face location along rock climbing route 206, processor 104 may execute instructions stored in route tagging module 120 to store in memory 118 orientation data representative of the orientation of rock climbing watch 102. The orientation data may be stored, for example, as data measured via sensor array 108 in response to one or more conditions being satisfied.

Processor 104 may execute instructions stored in route tagging module in memory 118 to determine a threshold time period, one or more motion profiles, and/or one or more sensor metric thresholds. Processor 104 may store as rock climbing navigational data the orientation of rock climbing watch 102.1 is being pointed at a rock face location by measuring via sensor array 108 when the user maintains the orientation of rock climbing watch 102.1 pointed towards rock face location 204.1 from base location 202 for a threshold minimum period of time (e.g., 2 or 3 seconds). That is, if the changes in sensor metric values measured by sensor array 108 (e.g., magnetometer or accelerometer metric values) are less than one or more sensor metric thresholds during the threshold period of time, then processor 104 may determine that rock climbing watch 102.1 is sufficiently still such that the data measured via sensor array 108 accurately reflects the orientation of rock climbing watch 102.1 as it is being pointed towards a rock face location of interest by a user.

Processor 104 may cause rock climbing watch 102.1 to acknowledge when the orientation data has been stored in memory 118 using any suitable manner, such as causing a vibration to occur by a feedback generator, an indication to be presented on display 114, or one or more audible tones to be emitted by a speaker (e.g., one or more "beeps").

Processor 104 may execute instructions stored in route tagging module 120 to use orientation data stored in memory 118 to determine one or more angles between locations on rock face 200, including a base location 202, intermediate rock face locations 204.1-204.N and/or a peak location 210 typically associated with an rock face location at the top of a rock climb. The angle between locations of a rock face 200 may represent a reference angle calculated from the orientation data of rock climbing watch 102.1 as it is being pointed towards a rock face location of interest. For example, the calculated angle may be an angle of incidence measured from the horizontal or vertical axis. Furthermore, because rock face 200 may generally have a three-dimensional structure (i.e., protrude towards a climber and/or away from a climber in various regions), this reference angle may be represented as a compound angle to provide a three-dimensional angle from a location on rock face 200 towards a rock face location of interest. In an embodiment, the same angular references may be used for each calculation for consistency.

For example, as shown in FIG. 2, when a climber points the rock climbing watch 102.1 from base location 202 to rock face location 204.1, processor 104 may utilize orientation data determined using sensor array 108 to calculate angles $\psi_1$ and $\theta_1$ between the horizontal plane and the direction of rock face location 204.1 from base location 202. Angles $\psi_1$ and $\theta_1$ may represent angular components of a compound angle in three dimensions between base location 202 and rock face location 204.1, with each of angles $\psi_1$ and $\theta_1$ being indicative of an angle from a respective axis. For example, if the ground of rock face 200 is associated with a horizontal x-axis, the direction above the ground of rock face 200 is associated with a vertical y-axis (i.e., increases as a climber ascends rock face 200), and the direction into (or out of) rock face 200 is associated with a z-axis, then angle $\psi_1$ may represent a yaw angle measured counterclockwise from a true north direction within a YZ plane formed by the y- and z-axes and angle $\theta_1$ may represent a pitch angle measured from the horizon within a XY plane formed by the x- and y-axes. Once rock climbing watch 102.1 stores in memory 118 the orientation data corresponding to angles $\psi_1$ and $\theta_1$ based on information provided by sensor array 108 to processor 104, the climber may proceed to climb rock face 200 along rock climbing route segment 206.1 until the user reaches rock face location 204.1.

Processor 104 may determine that the user's geographic location is at or near rock face location 202, 204.1-204.N, or 210 of rock face 200 by a variety of techniques. For example, processor 104 may determine a current geographic location by using location determining component 112, receive an input from the user using user interface 116 of rock climbing watch 102.1 that his approximate location is at rock face location 204.1, or use sensor array 108 to sense proximity of the rock climbing watch 102.1 to metallic objects typically present at rock face locations.

Processor 104 may recognize a unique motion of the rock climbing watch 102.1 caused by movement of the user's wrist as an indication that the approximate location of the rock climbing watch 102.1 is at or near a rock face location 202, 204.1-204.N, or 210. In embodiments, processor 104 may compare the motion data to one or more predetermined accelerometer data profiles representative of such movements. For instance, the climber may vigorously shake his hand to increase blood flow and relieve fatigue, commonly known as a "dangling arm shakeout," to indicate that the user's geographic location is at or near rock face location 204.1. Utilizing this technique takes advantages of a typical or commonly used motion by climbers as they reach rock face anchor locations. In an embodiment, processor 104 may recognize such motions by comparing the motion data to one or more predetermined accelerometer data profiles representative of such movements. This may be accomplished, for example, via a comparison of the motion data metric values received as input over a period of time to determine whether they match a predetermined motion profile. For example, one or more accelerometer values may correspond to a motion profile that is matched when the one or more accelerometer values match those stored in memory to within a threshold value.

Processor 104 may determine a current geographic location of rock climbing watch 102.1 using location determining component 112 and associate this geographic location with the rock face location at which the dangling arm shakeout has been performed. Processor 104 may store this current geographic location in memory 118 or transmit this current geographic location to one or more backend components 180.

Sensor array 108 may include one or more accelerometers that generate motion data indicative of a speed and/or direction of rock climbing watch 102.1. In accordance with such embodiments, processor 104 may be configured to execute instructions stored in route tagging module 120 to determine, based upon the motion data, if the movement of rock climbing watch 102.1 matches one or more motion profiles indicating that the climber has reached rock face location.

Processor 104 may also recognize hands-free input methods, such as an audible input, as an indication that the user of rock climbing watch 102.1 is located approximately at or near a rock face location 202, 204.1-204.N, or 210. For example, user interface 116 may include a microphone that is operable to receive voice commands from the user that are recognized by processor 104 as a suitable hands-free input method. Similarly, processor 104 may recognize the sound of a carabiner clip being attached to a bolt located at a rock face location to determine that that the user of rock climbing watch 102.1 is located approximately at or near a rock face location of rock face 200. Processor 104 may be configured to execute instructions stored in route tagging module 120 to determine whether this matches one or more audio profiles. The sound may be recognized via any suitable audio recognition techniques as an input corresponding to the climber reaching an anchor location. An example of a suitable audio recognition technique may include, for example, audio spectral component matching.

Processor 104 may also use sensor array 108 to sense proximity of the rock climbing watch 102.1 to metallic objects typically present at rock face locations to determine that the user of rock climbing watch 102.1 is located approximately at or near a rock face location 202, 204.1-204.N, or 210. For example, the climber may physically raise his arm or otherwise bring rock climbing watch 102.1 in proximity to (or actually touch rock climbing watch 102.1 to) a bolt located at rock face location 204.1, which may be detected by processor 104 using one or more sensors implemented by sensor array 108. For example, sensor array 108 may include one or more magnetometers that not only function to generate the orientation data, but also to determine the proximity of rock climbing watch 102.1 to ferrous metallic objects, such as climbing bolts.

Processor 104 may determine a current geographic location of rock climbing watch 102.1 using location determining component 112 and associate this geographic location with the rock face location at which the metallic object is sensed by one or more sensors of sensor array 108. Again, processor 104 may store this current geographic location in memory 118 or transmit this current geographic location to one or more backend components 180.

In accordance with such embodiments, processor 104 may be configured to execute instructions stored in route tagging module 120 to determine, based upon sensor metrics generated via sensor array 108, if rock climbing watch 102.1 is within a threshold proximity to metallic objects typically present at rock face locations. In such a case, processor 104 may recognize this proximity as an input corresponding to the climber reaching rock face location 202, 204.1-204.N, or 210.

Regardless of the technique used by processor 104 to determine that the user of rock climbing watch 102.1 has reached a rock face location, various embodiments include processor 104 executing instructions stored in route tagging module 120 to store rock climbing navigational data or sensor metrics upon arriving at the rock face location. For instance, processor 104 may store in memory 118 information associated with determined geographic locations of rock climbing watch 102.1 using location determining component 112 (e.g., coordinates generated via location determining component 112, estimated locations with reference to previously known or calculated rock face locations, etc.). For example, processor 104 may determine and store the coordinates of and time spent by the user at base location 202 (or peak location 210 if descending) and each rock face location 204.1-204.N as the user ascended up the rock face 202 along rock climbing route 206, the coordinates indicating the order and path along which the climber reached each rock face location of rock face 200.

In embodiments, processor 104 may store barometric pressure data generated via sensor array 108 when it determines that the user of the rock climbing watch 102.1 has reached rock face location 202, 204.1-204.N, or 210. If the climber is ascending and not descending rock face 200, processor 104 may also store an indication that rock face location 204.1 is the first rock face location along rock climbing route 206 from base location 202. Processor 104 may calibrate rock climbing watch 102.1 at base location 202 prior to the climber beginning his climb of rock face 200 and utilize the barometric pressure difference between the reference barometric pressure data and the barometric pressure data stored at various rock face locations 204.1-204.N or 210 as the user ascends rock face 200. For example, processor 104 may use the barometric pressure difference between base location 202 and rock face location 204.1 to calculate a change in elevation of rock climbing watch 102.1 as the climber traversed rock climbing route segment 206.1. This elevation change is indicative of the vertical distance between base location 202 and rock face location 204.1.

Processor 104 may employ trigonometric relationships between rock face locations 202, 204.1-204.N and 210 using the vertical distance between rock face locations and angles $\psi$ and $\theta$ to determine approximate rock climbing route segments 206.1-206.M in any suitable manner based upon the coordinate system and/or angular references used. For example, rock climbing route segments 206.1-206.M may be determined to be the hypotenuse of a triangle formed by the compound angle including the $\psi$ and $\theta$ angle components, with the vertical distance forming another leg of the same triangle. Additionally or alternatively, geographic location data provided to processor 104 by location determining component 112 as the climber ascended (or descended) between rock face locations 202, 204.1-204.N and 210 of rock face 200 may be used as precise rock climbing route 206.

Processor 104 may store in any suitable portion of memory 118 the calculated or determined rock climbing route 206 associated with route segments 206.1-206.M. Once a rock climbing route segment 206 has been calculated, the data may form part of the rock climbing navigational data. As described elsewhere, the route climbing navigational data may be presented as a three-dimensional rock climbing navigational map. For example, at this point of the climb of rock face 200 from base location 202, the rock climbing navigational data may include the initial geographic location of base location 202 as determined by the location determining component 112, a direction to rock face location 204.1 from base location 202 based upon angles $\psi_1$ and $\theta_1$ determined based on the orientation of the rock climbing watch while it was pointed towards rock face location 204.1, and the calculated rock climbing route segment 206.1.

As described above, location determining component 112 may not be able to determine a current geographic location of the rock climbing watch 102.1 at all locations on the rock face. Processor 104 may initially store in memory 118 the geographic location of one rock face location 202, 204.1-204.N or 210, such as base location 202, and reference this "known location" to estimate the geographic locations of other rock face locations based on rock climbing navigational data collected as the user continues to climb and additional orientation data and elevation data is determined and stored. For example, the initial geographic location may be determined by using location determining component 112 or receive from one or more backend components 180. The rock climbing navigational data may be further updated or appended until the climber reaches peak location 210 of rock face 200, which is further discussed below. Thus, in embodiments, processor 104 may receive from the location determining component 112 a determined known geographic location for at least one rock face location 202, 204.1-204.N and 210 of rock face 200 and estimate the geographic locations of other rock face locations based on rock climbing navigational data.

For example, processor 104 may use the known location of base location 202 and the angles $\psi_1$ and $\theta_1$ (and/or $\psi_2$ and $\theta_2$) to calculate an estimated location of rock climbing route segment 206.1 and an estimated geographic location of rock face location 204.1. Processor 104 may store the estimated geographic location information in memory 118. Similarly, an estimated geographic location of rock face location 204.2 may be calculated with reference to the estimated geographic location of rock face anchor 204.1 based on calculated angles $\psi_3$ and $\theta_3$ (and/or $\psi_4$ and $\theta_4$) and/or path of rock climbing route segment 206.2. The process of calculating estimated geographic locations based on rock climbing navigation data and a known location may be repeated any suitable number of times as a user climbs a rock face 200, thereby mapping known and estimated geographic locations of rock face locations 202, 204.1-204.N and 210 as the user traverses a rock face 200.

In various embodiments, rock climbing watch 102.1 may utilize additional data to increase the accuracy of estimated rock face locations and/or route segment length calculations by improving the accuracy of the calculated angles between one or more rock face locations having a rock face location.

Because a rock climbing route 206 may be traversed more than one time, memory 118 of rock climbing watch 102.1 may include rock climbing navigational data collected by rock climbing watches 102.1-102.N. For instance, the rock climbing navigational data may be downloaded from a backend computing device 180 to memory 118 for use while climbing rock face 200 along rock climbing route 206. As the user of a rock climbing watch 102.1 climbs the rock face, processor 104 may execute instructions stored in route tagging module 120 to prompt the climber to point the rock climbing watch 102.1 towards each rock face location 202, 204.1-204.N and 210 as the user traverses a rock face 200 to collect additional rock climbing navigational data. Processor 104 may determine a difference between the calculated angle and/or distance and the stored angle and/or distance between each rock face location. If the determined difference exceeds an acceptable error threshold (e.g., difference exceeds 5%, 20 degree angle, 5 foot distance, etc.), processor 104 may store an indication in memory 118 that the calculated angle and/or distance may be inaccurate. If the determined difference is less than the acceptable error threshold, processor 104 may store an indication in memory 118 that the calculated angle and/or distance is accurate.

Additionally, in embodiments, processor 104 may prompt the climber to point the rock climbing watch 102.1 back towards the last rock face location to calculate a second angle between the rock face locations. For example, upon a user reaching rock face location 204.1 and storing calculated angles $\psi_1$ and $\theta_1$ in memory 118, as previously discussed above, processor 104 may execute instructions stored in route tagging module 120 to prompt the climber to point the rock climbing watch 102.1 back towards base location 202 to enable processor 104 to calculate angles $\psi_2$ and $\theta_2$ to verify the accuracy of the initial calculation made from base location 202. Similar to how the climber initially pointed rock climbing watch 102.1 at rock face location 204.1 from base location 202 such that angles $\psi_1$ and $\theta_1$ were calculated by processor 104 based on the orientation of the rock climbing watch 102.1 points towards rock face location 204.1, the climber may now point rock climbing watch 102.1 back toward base location 202 from rock face location 204.1 such that angles $\psi_2$ and $\theta_2$ are calculated. Processor 104 may compare calculated angles $\psi_1$ and $\psi_2$, which may represent a yaw angle measured counterclockwise from a true north direction, to determine whether a determined difference between the calculated angles exceeds or is less than an error threshold for the yaw angle $\psi$. Similarly, processor 104 may compare calculated angles $\theta_1$ and $\theta_2$, which may represent a pitch angle measured counterclockwise from a true north direction, to determine whether a determined difference between the calculated angles exceeds or is less than an error threshold for the pitch angle $\theta$. In embodiments, if the determined difference between the calculated angles is less than an acceptable error threshold for the pitch angle $\theta$ and/or yaw angle $\psi$, processor 104 may store in memory 118 an indication that the calculated angles are verified to be accurate. For example, the indication may be stored in a table containing rock climbing navigation data, including the calculated angles. If calculated angles exceed an acceptable error threshold for the pitch angle $\theta$ and/or yaw angle $\psi$, processor 104 may store in memory 118 an indication in the table that calculated angles $\psi_1, \psi_2$ and/or $\theta_1$, $\theta_2$ are inaccurate because the acceptable error threshold has been exceeded for the pitch angle $\theta$ and/or yaw angle $\psi$.

Furthermore, while the climber is positioned at rock face location 204.1, rock climbing watch 102.1 may also be pointed toward rock face location 204.2, such that angle $\psi_3$ and $\theta_3$ are calculated. As previously discussed, processor 104 may determine when rock climbing watch 102.1 is sufficiently still and relay feedback to the climber that the orientation data has been collected and stored in each case for the angle between rock face location 204.1 and rock face location 204.2 to be calculated. As the climber ascends rock face 200, each of angles $\psi_2$ to $\psi_6$ and $\theta_2$ to $\theta_6$ may be calculated in the same manner as angles $\psi_1$ and $\theta_1$, using the respective orientation data and elevation data determined and collected at each rock face location 204.2-204.N and 210.

In various embodiments, rock climbing navigational data, such as the compound angles between rock face locations 202, 204.1-204.N and 210, lengths of rock climbing route segments 206, vertical distances based on barometric altimeter measurements, and the estimated geographic locations of rock face locations may be calculated based upon any suitable number of orientation data. For example, processor 104 may execute instructions stored in route tagging module 120 to select one of $\psi_1$ and $\psi_2$, and $\theta_1$ and $\theta_2$, or calculate a mean value (average) of ($\psi_1$ and $\psi_2$, and $\theta_1$ and $\theta_2$, respectively, and calculate the length of route segment 206.1. Selecting the most accurate $\psi$ and $\theta$ angles and/or calculating mean value of the $\psi$ and $\theta$ angles may reduce user error because, although the $\psi$ and $\theta$ angles should ideally be the same angle measurement as the climber points in both directions, the angles may not be due to user error when aiming rock climbing watch 102.1. The climber may repeat the process of entering an input indicating that each rock face location has been reached and, once at each rock face location, the climber may repeat the process of aiming rock climbing watch 102.1 towards the previous rock face location and aiming rock climbing watch 102.1 towards the next rock face location. Once the climber reaches peak location 210, the climber may also aim rock climbing watch 102.1 back towards rock face location 204.N from peak location 210.

Once the climber reaches peak location 210, the rock climbing navigational data may include the length of each rock climbing route segments 206.1-206.M and the compound angles $\psi$ and $\theta$ between each rock face location 202, 204.1-204.N and 210. Although the previous example was provided with reference to an ascent of rock face 200, this process may equally apply to a climber descending rock face 200.

In some embodiments, the rock climbing navigational data may be formatted for presentation for only the ascent or descent of rock face 200. But in other embodiments, the rock climbing navigational data may be reformatted for either the ascent or the descent of rock face 200. For example, a climber may, once reaching peak location 210, interact with rock climbing watch 102.1 to indicate that the climber is now descending rock face 200 along rock climbing route 206. The climber may repeat each step of aiming rock climbing watch 102.1 towards each rock face location in reverse order while descending, generating a separate set of calculated angles between rock face locations 202 and 204.1-204.N and a separate set of calculated rock climbing route segments 206.1-206.M. In such a case, processor 104 may use the barometric pressure at peak location 210 as the initial reference value when the climber descends rock face 200 to calculate vertical distances between rock face locations.

In accordance with such embodiments, processor 104 may calculate the angles between adjacent rock face locations along rock climbing route 206 and lengths of rock climbing route segments 206.1-206.M by averaging the ascent calculations and the descent calculations. For example, because the rock face location number was stored during the climber's ascent and is associated with each of rock face locations 204.1-204.N (e.g., 204.1=#1, 204.2=#2, 204.N=#3, etc.) processor 104 may now associate the last rock face location 204.N as the first rock face location when the climber descends rock face 200. In this way, the rock climbing navigation data generated and stored by rock climbing watch 102.1 may provide more accurate data by averaging calculations from climbs in both the ascending and descending directions.

Regardless of the number of calculations used in generating the rock climbing navigational data, the data may include sufficient information to construct a three-dimensional map in the form of a wireframe including the rock face locations and each of rock climbing route segments 206.1-206.M as well as the spatial relationships between rock face locations 202, 204.1-204.N and 210. This three-dimensional wireframe map may then be used to assist future climbers, which is further discussed below.

Processor 104 may be operable to provide a quantitative assessment regarding the accuracy of the calculated rock climbing navigational data. Accuracy grading module 122 is a portion of memory 118 configured to store instructions that, when executed by processor 104, cause processor 104 to perform various acts in accordance with applicable embodiments as described herein. In an embodiment, accuracy grading module 122 includes instructions that, when executed by processor 104, cause processor 106 to grade the accuracy of the rock climbing navigational data calculated and stored in memory 118. As previously discussed, the climber may repeat the process of aiming rock climbing watch 102.1 toward one more rock face locations 204.1-204.N, base location 202, and/or peak location 210 to obtain multiple angles $\psi_1$-$\psi_6$ and $\theta_1$-$\theta_6$ between the rock face locations, from which the rock climbing route segments 206.1-206.M are calculated and stored by processor 104. Accuracy grading module 122 may include instructions that, when executed by processor 104, assign a grade to the calculation of each rock climbing route segment 206.1-206.M and the direction to another rock face location based upon differences from the multiple aiming processes. In some embodiments, these grades may be based upon the differences in multiple aiming processes in one climbing direction (e.g., ascent only). In other embodiments, these grades may be based upon the differences from multiple aiming processes in both climbing directions.

In various embodiments, processor 104 may utilize an error threshold to determine whether new rock climbing navigational data should be collected and stored. Any suitable type of rating and/or grading system may be utilized to assign indicia of accuracy in such a manner. For example, letter grades, numbers, colors, etc., may be utilized. To provide an illustrative example, processor 104 may indicate that route climbing navigational data is accurate by presenting 5 stars or assigning a letter grade of 'A,' when the determined difference between $\psi_1$ and $\theta_1$ and $\psi_2$ and $\theta_2$, respectively, is less than an acceptable error threshold represented by a number of degrees (e.g., 3 degrees under the acceptable error threshold, 5 degrees under the acceptable error threshold, etc.). Continuing this example, the grading system may indicate that route climbing navigational data is inaccurate by presenting 1 star or assigning a grade of 'F,' when the determined difference between ($\psi_1$ and $\theta_1$ and $\psi_2$ and $\theta_2$, respectively, by exceeds the acceptable error threshold by more than some maximum number of degrees (e.g., 10 degrees over the acceptable error threshold, 12 degrees over the acceptable error threshold, etc.) The calculated rating and/or grade for the route climbing navigational data may be stored in memory 118 with the route climbing navigational data. In this way, other climbers later using the route climbing navigational data may place an appropriate level of confidence in the information displayed using the route climbing navigational data based upon the corresponding rating and/or grade, which is further discussed below.

In embodiments, processor 104 may determine a rating and/or grade based on the extent of data available for the rock face 200. For instance, the angles $\psi_1$ and $\theta_1$, and angles $\psi_2$ and $\theta_2$ may be calculated multiple times either by a single user or a plurality of users that climb rock face 200 around rock climbing route 206, which provides increased confidence for the rock face locations 204.1-204.N and 210. Comparing the calculated route climbing navigational data from each set climbs may allow a more accurate rating and/or grade to be determined based upon any differences between the data using an error threshold.

Error correction module 124 is a portion of memory 118 configured to store instructions that, when executed by processor 104, cause processor 104 and/or GPU 106 to perform various acts in accordance with applicable embodiments as described herein. In an embodiment, error correction module 124 includes instructions that, when executed by processor 104, cause processor 104 to determine whether rock climbing navigation data (that was recently determined or previously stored) is accurate or inaccurate based on whether a determined difference exceeds an error threshold. In embodiments, processor 104 may account for inaccurate rock climbing navigation data by presenting a notification on display 114 and a recommendation that the watch be pointed from a towards a rock face location of interest again, discarding the newly calculated or determined rock climbing navigational data, overwriting stored rock climbing navigation data with newly calculated or determined rock climbing navigational data, or applying weight to the stored rock climbing navigation data and the newly calculated or determined rock climbing navigational data (e.g., median, mean, or mode of the data set).

Rock face locations 202, 204.1-204.N and 210 for sport climbs are typically located or strategically placed spaced apart based on the skill level of climbers expected to travel the rock face 200. For instance, the rock face locations 202, 204.1-204.N and 210 may be spaced from another some vertical distance, V, and within some range of angles defined by a number of degrees, D. These V and D values may increase as the skill level of climbers expected to travel the rock face 200 increases.

As described above, rock climbing watch 102.1 may determine and store these V and D values in memory 118 as rock climbing navigational data is calculated by processor 104. These V and D values may be stored in the form of a database in memory 118 for subsequent use by rock climbing watch 102.1-102.N. In embodiments, processor 104 may estimate typical V and D values by averaging V and D data stored in memory 118 from climbs from this or other rock faces or otherwise using values obtained from known common ranges of V and D values, which may be stored as predetermined values in a rock memory 118. In an embodiment, error correction module 124 may facilitate the calculation of a weighted error correction value that is added to the vertical distance, V, to estimate the geographic location of rock face locations 202, 204.1-204.N and 210 and rock climbing route 206.

For example, changes in barometric pressure sensed by sensor array 108 may be used to calculate a vertical distance between rock face locations 202, 204.1-204.N and 210, but this elevation data may be considered less accurate than the angle data included in the rock climbing navigational data due to the differences in the types of sensors within sensor array 108 that may have been used to collect this information. To provide another example, if the pitch angle between adjacent rock face locations 202, 204.1-204.N and 210 is close to zero (referenced from the horizon) then the elevation data may induce a greater error in the trigonometric calculation of the route segment length. Therefore, based on the accuracy of the sensor of sensor array 108 used to collect information, the angle data may be weighted more heavily than the elevation data, and vice versa. For instance, if the orientation of rock climbing watch 102.1 indicates that the pitch angle (1) from a current rock face location 204.1-204N is close to a value indicating that another rock face location 204.2-204N is nearly directly below (e.g., −85 degrees from the horizon), processor 104 may determine that the length of rock climbing route segment 206.1-206.M should be approximately equal to a vertical distance between adjacent rock face locations 204.1-204N. In this situation, processor 104 may give more weight to the elevation data when determining a length of rock climbing route segment 206.1-206.M.

It should be understood that processor 104 may utilize any suitable weighting scheme based upon different sources of route climbing navigation data relating to rock face locations, angles and distances between the rock face locations and the length of rock climbing route segments between rock face locations. The previous example of a high pitch angle placed more weight on determined elevation data, but various embodiments may place more or less weight on the elevation data, the angle data, and/or other data sources to increase the accuracy of calculations relating to the length of rock climbing route segments 206.1-206.M. For instance, if the pitch angle between rock face locations was nearly zero (e.g., one or two degrees), then processor 104 may execute instructions stored in error correction module 124 to facilitate weighing the typical segment length more heavily than the elevation data when calculating the length of rock climbing route segments 206.1-206.M, which may result in calculating a typical segment length, V, (e.g., 9 feet). In this way, processor 104 may reduce the effects of altimeter error, which would be most apparent for rock face locations having low pitch angles between the rock face locations.

Processor 104 may access instructions stored in error correction module 124 to determine whether rock face locations 202, 204.1-204.N and 210 along rock climbing route 206 and/or the lengths of rock climbing route segments 206.1-206.M are accurate once the rock climbing navigational data for rock climbing route 206 has been completely determined and stored in memory 118. For example, once a user ascends and/or descends rock face 200, processor 104 may compare the total calculated vertical distance based upon changes in the elevation data between base location 202 and peak location 210 to the sum of vertical distances calculated between each of the rock climbing route segments 206.1-206.M to determine whether the total distances are accurate based on whether the sum of calculated vertical distances exceed an error threshold, such as 5%, when compared to the changes in the elevation data. In embodiments, processor 104 may access instructions stored in error correction module 124 to adjust rock face location 202, 204.1-204.N and 210 along rock climbing route 206 and/or the lengths of rock climbing route segments 206.1-206.M stored in memory 118.

Therefore, embodiments include instructions stored in error correction module 124 may determine whether rock face locations 202, 204.1-204.N and 210 and associated rock climbing navigational data are accurate or inaccurate based on whether the angles and/or distances between adjacent rock face locations along rock climbing route 206 are less than or exceed some error threshold value. As described above, processor 104 may minimize the impact of inaccurate angle and/or elevation data when calculating rock face locations 202, 204.1-204.N and 210 along rock climbing route 206 or the lengths of rock climbing route segments 206.1-206.M.

Route navigation module 126 is a portion of memory 118 configured to store instructions that, when executed by processor 104, cause processor 104 and/or GPU 106 to perform various acts in accordance with applicable embodiments as described herein. Route navigation module 126 may include instructions that, when executed by processor 104 and/or GPU 106, cause processor 104 and/or GPU 106 to work in conjunction with one another, with sensor array 108, location determining component 112, and/or user interface 116 to facilitate climber navigation of rock face 200 utilizing previously stored rock climbing navigational data. For example, once rock climbing navigational data has been stored in a suitable portion of memory 118, a climber may select a suitable option from those displayed via display 114 to indicate that the climber is ready to climb rock face 200. When processor 104 receives such an input, processor 104 may execute instructions stored in route navigation module 126 to cause GPU 106 to display various types of information via display 114. Processor 104 may execute instructions stored in route navigation module 126 to facilitate providing feedback to a user and/or enabling one or more user interactions with rock climbing watch 102.1 via user interface 116. For example, instructions stored in route navigation module 126 may enable rock climbing watch 102.1 to guide or assist a climber to go to base location 202, to display a direction and distance between each rock face location 202, 204.1-204.N, 210, to display the current rock climbing route segment 206.1-206.M the user is climbing, to display a grade associated with the displayed rock climbing route segments 206.1-206.M, to display the next rock face location 202, 204.1-204.N, 210 for the climber to clip to, etc. These functions are discussed in further detail below with reference to FIG. 3.

User interface module 128 is a portion of memory 118 configured to store instructions that, when executed by processor 104 and/or GPU 106, cause processor 104 and/or GPU 106 to perform various acts in accordance with applicable embodiments as described herein. In an embodiment, user interface module 128 includes instructions that, when executed by processor 104 and/or GPU 106, cause processor 104 and/or GPU 106 to work in conjunction with one another and/or with user interface 116 to facilitate user interactions with rock climbing watch 102.1. User interface 116 may include one or more components such as various buttons, switches, knobs, etc., while user interface module 128 may include instructions that, when executed by processor 104, facilitate the detection of the various interactions between a user and one or more components implemented via user interface 116. In an embodiment, user interface module 128 may facilitate the detection of one or more inputs indicating that a user has reached a rock face location 202, 204.1-204.N, 210 and the determination that a particular mode, such as route tagging mode or a route navigation mode, has been selected using user interface 116.

Figure 3:
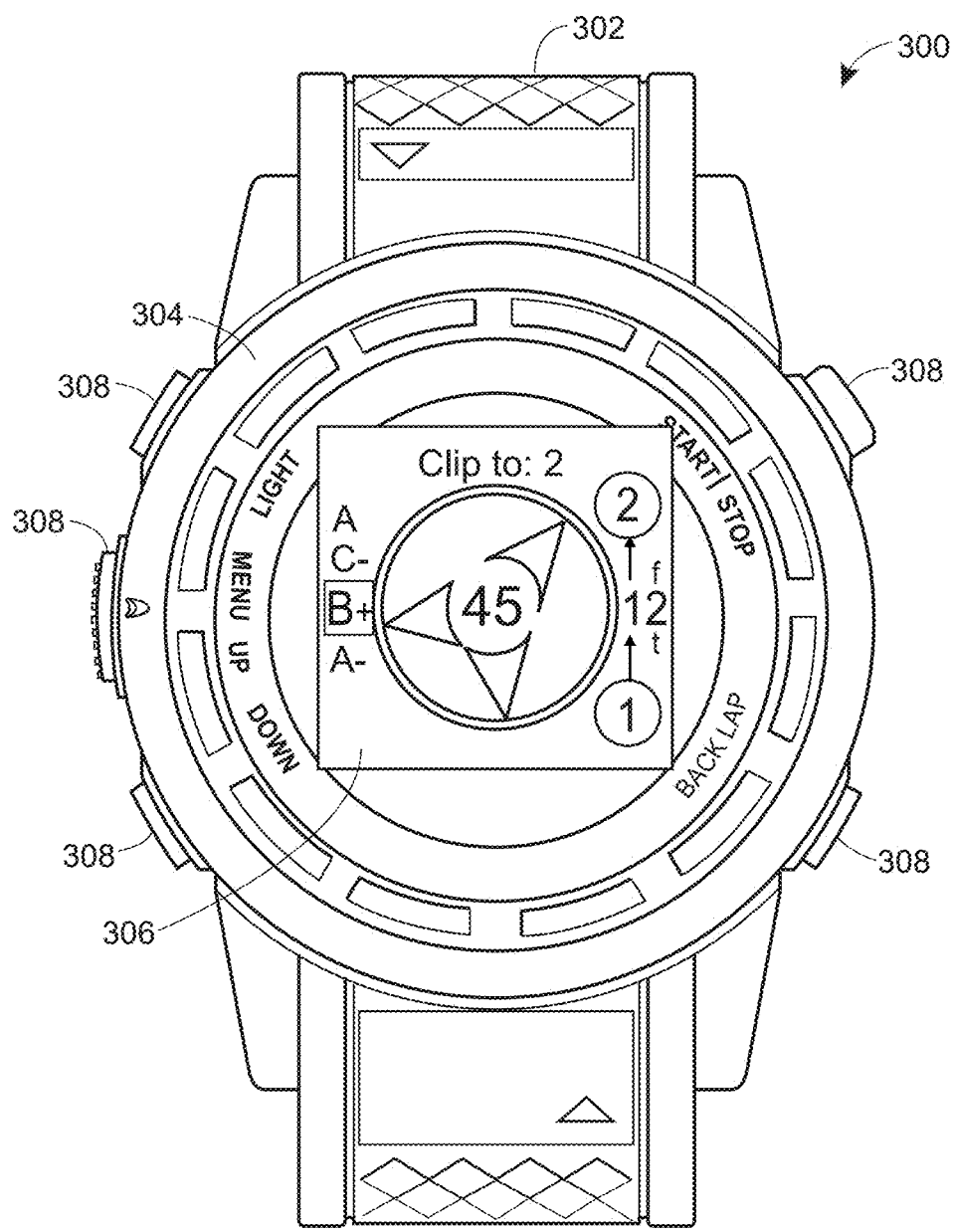
FIG. 3 is an illustration of an exemplary rock climbing watch 300 in accordance with an embodiment of the present disclosure.

FIG. 3 is an illustration of an exemplary rock climbing watch 300 in accordance with an embodiment of the present disclosure. Rock climbing watch 300 includes a band 302, a housing 304, a display 306, and one or more interactive buttons 308. In an embodiment, rock climbing watch 300 is an implementation of one of rock climbing watches 102.1-102.N, as shown in FIG. 1. Rock climbing watch 300 may display various types of information, which may be the result of processor 104 executing instructions stored in route navigation module 126, for example, as previously discussed with reference to FIG. 1. As shown in FIG. 3, display 306 indicates various types of information. For example, display 306 may present information during a climb of rock face 200 using previously stored rock climbing navigation data once rock climbing watch 300 receives user selection of the route navigation mode from user interface 116. A climber may place rock climbing watch into the navigational mode, for example, by navigating through one or more menu options to make this selection, for example, via interactive buttons 308. In an embodiment, once rock climbing watch 300 is placed into navigational mode, rock climbing watch 300 may provide feedback to assist the climber in navigating a rock face using a previously generated rock climbing navigational data instead of prompting a climber to aim and store anchor locations.

As previously discussed with reference to FIG. 1, when collecting and storing the rock climbing navigational data for the first time, a climber may indicate his or her position at the starting point or base of a rock face, which may be stored as part of the rock climbing navigational data, for example, using a geographic location (e.g., latitude and longitude coordinates) determined by location determining component 112. Once rock climbing watch 300 enters navigational mode, display 306 may present information to guide the climber to base location 202 via any suitable number of audio instructions and/or graphical displays, such as those provided by a typical GPS unit, for example.

Once rock climbing watch 300 has determined that the climber has arrived at the base location 202 of rock face 200, processor 104 may retrieve from memory 118 a three-dimensional wireframe rock climbing navigational map based on rock climbing navigational data. Display 306 may present information to aid a rock climber with determining the direction to the first rock face location 204.1 and the length of rock climbing route segment 206.1. Using rock face 200 as an example, rock climbing watch 300 may present on display 306 a direction indicative of the compound angle calculated from angles $\psi_1$ and $\theta_1$ to guide the climber to rock face location 204.1 from base location 202.

As previously discussed with reference to FIG. 1, rock climbing watch 300 may determine that a climber has reached one or more rock face locations 202, 204.1-204.N, 210 using various techniques, such as voice commands, determining movement of the rock climbing watch 300 associated with a shakeout motion, etc. Similarly, when in navigational mode, rock climbing watch 300 may receive from a user any of these types of inputs using user interface 116 to indicate that he or she has reached a rock face location 202, 204.1-204.N, or 210.

Using rock face 200 as an example, once rock climbing watch 300 determines that the climber has reached rock face location 204.1 (rock face location 1), rock climbing watch

300 may present on the right side of display 306 an indication, as shown in FIG. 3, that the user has reached the first rock face location (rock face location 204.1) along rock climbing route 206 and is in the process of climbing to and clipping to the second rock face location (rock face location 204.2.) along rock climbing route 206. Continuing this example, while the climber is climbing rock climbing route segment 206.2, display 306 may also display other information to assist the climber. For example, display 306 may indicate the grade associated with route segment 206.2, which is a B+ in this example. Furthermore, display 306 may indicate the length of route segment 206.2, which is 12 feet in this example. Display 306 may also include any suitable graphic and/or label to indicate a direction from rock face location 204.1 to rock face location 204.2. The example shown in FIG. 3 includes a directional arrow and degrees from the vertical axis (45). However, the direction to the next rock face location may be indicated in any suitable manner, such as only a directional arrow, a two-dimensional arrow as shown in FIG. 3, a three-dimensional arrow, a wireframe display, etc. In embodiments, text may be presented on display 306 to indicate a direction from rock face location 204.1 to rock face location 204.2.

In embodiments, display 306 may initially present the direction and/or route segment length when a climber indicates that he or she has reached the next rock face location. As the user climbs, this information may remain unchanged, resulting in the same information being displayed until the processor 104 determines that the climber has reached the next rock face location. This advantageously eliminates the need to track the climber's position via inertial navigation techniques, which can be complex and inaccurate. As the climber completes a particular rock climbing route segment 206.1-206.N, the climber's rope is typically tied to a bolt or other accessory available to the climber at the previous rock face location the climber is climbing from ("1" in the example shown in FIG. 3). Using the climbing rope as a reference, the climber can compare the direction displayed on display 306 to the direction of the climbing rope to maintain his or her course along rock climbing route segment 206.1-206.N.

A climber may repeat the process of providing an input at each rock face location along rock climbing route 206 until the climber has reached the peak location 210 of rock face 200. In this way, rock climbing watch 300 may collect rock climbing navigational data and provide direction and/or distance information between each rock face location using the rock climbing navigational data to guide the rock climber along rock climbing route 206.

Figure 4:
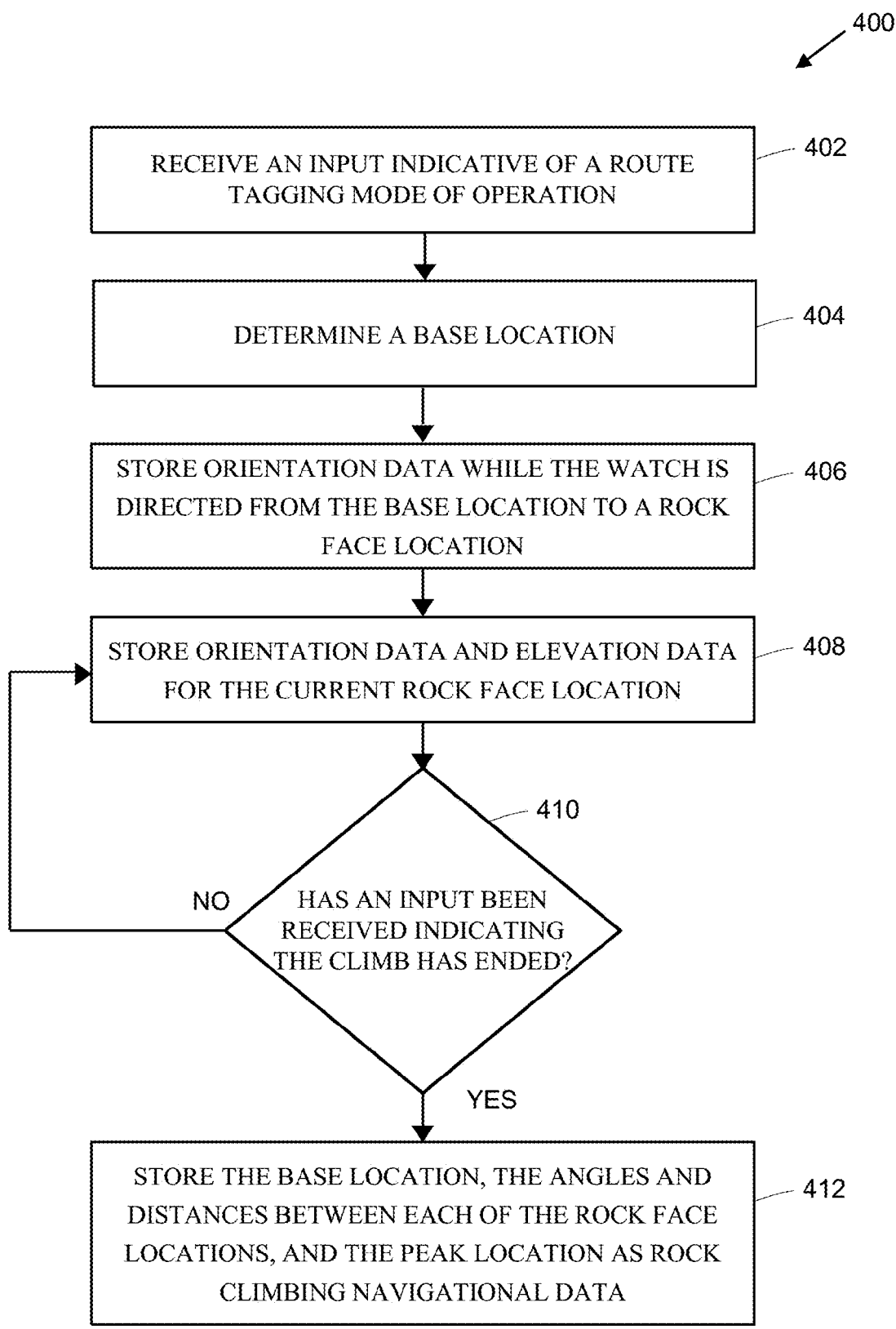
FIG. 4 illustrates a method flow 400, according to an embodiment.

FIG. 4 illustrates a method flow 400, according to an embodiment. In an embodiment, one or more portions of method 400 (or the entire method 400) may be implemented using any suitable device. For example, one or more portions of method 400 may be performed by rock climbing watch 102.1, as shown in FIG. 1. To provide another example, one or more portions of method 400 may be performed by rock climbing watch 300, as shown in FIG. 3. In an embodiment, method 400 may be performed by any suitable combination of one or more processors, applications, algorithms, and/or routines, such as processor 104 executing instructions stored in one or more of route tagging module 120, accuracy grading module 122, error correction module 124, route navigation module 126, and/or user interface module 128, for example, as shown in FIG. 1.

Method 400 may start when one or more processors receive an input indicative of a route tagging mode of operation (block 402). This input may be received, for example, via a user selecting the appropriate option from a display associated with the rock climbing watch (block 402). This input may indicate that the user wishes to store a new rock climbing navigational data (block 402). Method 400 may include one or more processors determining a base location of the rock face (block 404). This may include, for example, the user providing a suitable input via the rock climbing watch to indicate the base location has been reached (block 404). In response to this input, the one or more processors may associate a geographic location of the rock climbing watch with the base location (block 404).

Method 400 may include one or more processors storing orientation data while the rock climbing watch is pointed from the base location to another rock face location along a rock climbing route (block 406). This may include, for example, the user aiming the rock climbing watch to a first rock face location and holding the rock climbing watch sufficiently still such that orientation data for the rock climbing watch is stored in memory (block 406).

Method 400 may include one or more processors storing orientation data and elevation data for a current rock face location (block 408). This may include, for example, the climber indicating that he or she has reached the next rock face location via any suitable input (block 408). In embodiments, upon receipt of this input, the rock climbing watch may prompt the climber to aim the rock climbing watch in the direction of first the next rock face location and then the previous rock face location (block 408). Upon storing orientation data for each direction from the first rock face location (e.g., to the next rock face location and last rock face location), method 400 may include one or more processors storing angle data and elevation data, which may be based on a difference between barometric pressure data from the previous rock face location (or base location or peak location) and the current rock face location (block 408).

Method 400 may include one or more processors determining whether the climb has ended (block 410). This determination may be made, for example, upon a user selecting the appropriate menu option indicating that an ascent and/or descent has been completed (block 410). If so, the method 400 may continue to store one or more portions of the rock climbing navigational data (block 412). Otherwise, method 400 may continue to store orientation data and elevation data for additional rock face locations until an input is received indicating that the ascent and/or descent has been completed (block 408).

Method 400 may include one or more processors storing the base location, angles between each of the rock face locations (and base and peak locations), and the distances between each of the rock face locations (and base and peak) as part of rock climbing navigational data (block 412). This may include, for example, calculating route segments and directions from a calculated mean, median or mode of angles using multiple sets of orientation data, as previously discussed with reference to FIG. 1 (block 412).

Figure 5:
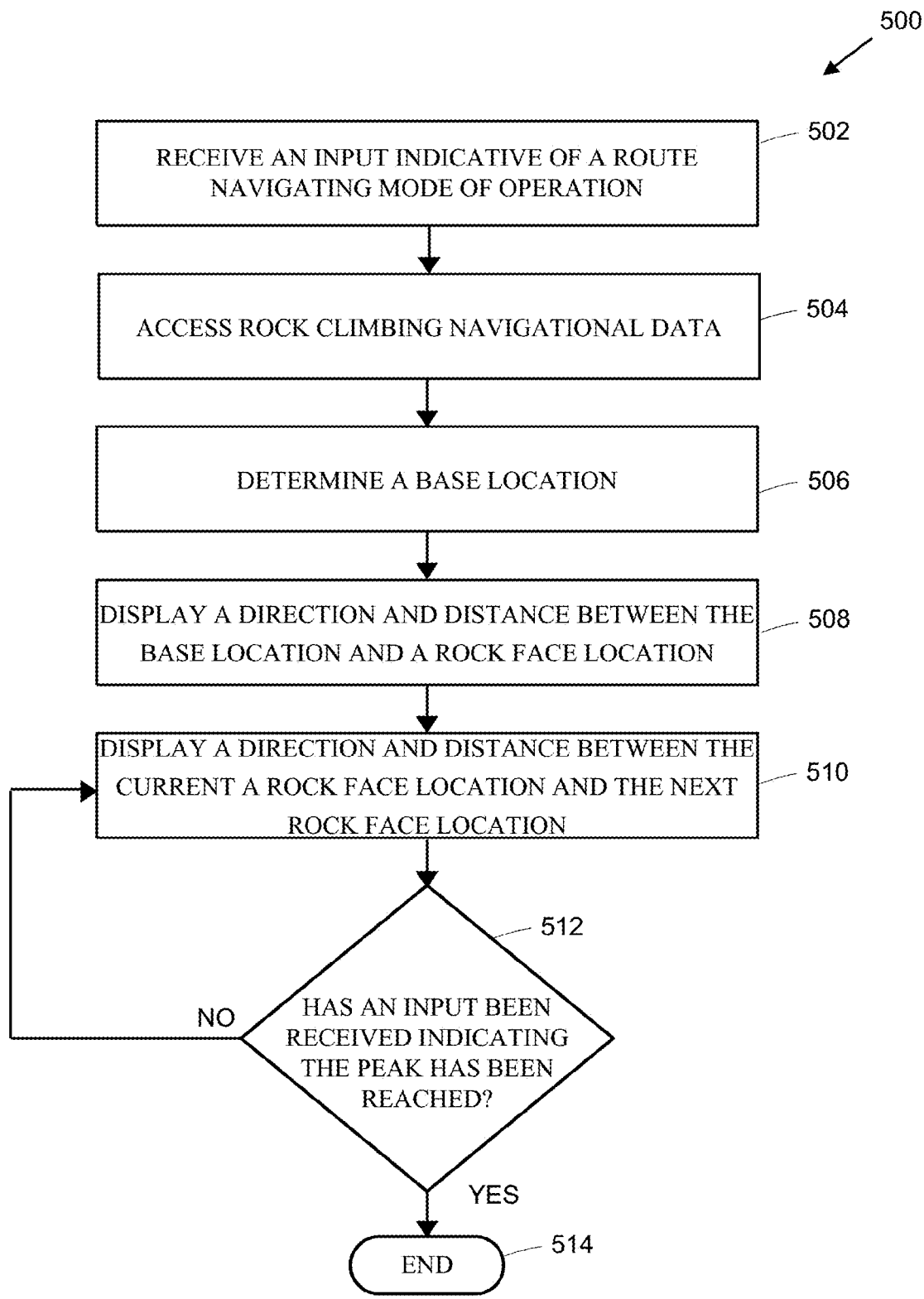
FIG. 5 illustrates a method flow 500, according to an embodiment.

FIG. 5 illustrates a method flow 500, according to an embodiment. One or more portions of method 500 (or the entire method 500) may be implemented utilizing any suitable device. For example, one or more portions of method 500 may be performed by rock climbing watch 102.1, as shown in FIG. 1. To provide another example, one or more portions of method 500 may be performed by rock climbing watch 300, as shown in FIG. 3. In an embodiment, method 500 may be performed by any suitable combination of one or more processors, applications, algorithms, and/or routines, such as processor 104 executing instructions stored in one or more of route tagging module 120, accuracy grading module 122, error correction module 124, route navigation module 126, and/or user interface module 128, for example, as shown in FIG. 1.

Method 500 may start when one or more processors receive an input indicative of a navigating mode of operation (block 502). This input may be received, for example, via a user selecting the appropriate option from a display associated with the rock climbing watch. This input may indicate that the user desires to navigate a rock face along a rock climbing route (block 502).

Method 500 may include one or more processors accessing rock climbing navigational data (block 504). This rock climbing navigational data could include, for example, rock climbing navigational data that was previously generated and stored via method 400 (block 412). The rock climbing navigational data may be accessed via any suitable portion of the rock climbing watch (block 504). The rock climbing navigational data may be downloaded to the rock climbing watch via a suitable interface, as previously discussed with reference to FIG. 1 (block 504).

Method 500 may include one or more processors determining a base location of the rock face using the data from the stored rock climbing navigational data (block 506). Method 500 may include the rock climbing watch displaying any suitable number and/or type of feedback to guide a user to the base location (block 506).

Method 500 may include one or more processors displaying a direction and distance from the base location to a rock face location (block 508). This rock face location could be, for example, the first rock face location from the base location as the climber climbs the rock face (block 508). The angle and distance may be displayed utilizing, for example, the values stored with the rock climbing navigational data, as previously discussed with reference to FIG. 3 (block 508).

Method 500 may include one or more processors displaying a direction and distance between the current rock face location and the next rock face location (block 510). The angle and distance may be displayed utilizing, for example, the values stored with the rock climbing navigational data, as previously discussed with reference to FIG. 3 (block 510).

Method 500 may include one or more processors determining whether an input has been received indicative of the climber reaching the peak of the rock that is being climbed (block 512). This determination may be made, for example, upon a user selecting the appropriate menu option indicating that an ascent and/or descent has been completed (block 512). If so, the method 500 may end (block 514), causing the rock climbing watch to exit the navigating mode of operation. Otherwise, method 500 may continue to display the direction and distance between additional rock face locations as each one is reached (block 510).

Referring back to FIG. 1, in various embodiments, the rock climbing navigational data may be made available to one or more users via any suitable platform, such as a social media web application, for example. In accordance with such embodiments, a climber may store one or more rock climbing navigational data for respective various rock faces as part of his or her user profile. The user profile may include, for example, the user's contact information, skill level, a description of the rock climbing navigational data, a location of the rock for which the rock climbing navigational data is applicable, a rock climbing navigational map, favorite climbs, etc.

In accordance with such embodiments, a user may upload rock climbing navigational data determined and stored by the rock climbing watch during one or more climbs to his or her user profile with comments, ratings, descriptions, etc.

For example, a climber may indicate a difficulty rating for an entire rock climb, a difficulty rating for individual rock climbing route segments, whether one or more rock climbing segments are "run out," (missing preexisting bolts for sport climbs), etc. Additionally or alternatively, the user profile may include the grades for each tagged rock climbing segment, an overall grade for the rock climbing navigational data (e.g., by averaging all rock climbing segments included in the map), etc. Further in accordance with such embodiments, other users may view one or more portions of other user's profiles in accordance with any suitable searching, filtering, and/or sorting techniques. For example, a user may access backend computing device 180 and provide one or more inputs to a web application hosted via backend computing device 180. In response to these inputs, backend computing device 180 may search through various criteria provided by the user such as rock climbing descriptions, locations, difficulty ratings, climber skill levels, difficulty ratings, etc., corresponding to various rock climbing navigational data. In this way, a user may sort rock climbing navigational data based one or more criteria, allowing beginning climbers to only view rock climbing navigational data created by other beginning climbers, for example. To provide another example, a user may decide to filter rock climbing navigational data according to overall or average grades such that only those rock climbing navigational data with an average grade of B or better, for example, are displayed.

The foregoing describes various embodiments of a rock climbing watch generating rock climbing navigational data referenced to a base location, a peak location, and various intermediate rock face locations located therebetween. However, the rock climbing navigational data may be generated based on any suitable reference point. For example, a user may start the map generation process at an intermediate point, such as rock face locations 204.1-204.N, along a rock climb between the base and peak locations. In this way, the "starting" point for a climb in which rock climbing navigational data is generated may be the base location along a rock climbing route (e.g., when starting to ascend a rock face), an rock face location at the top of a rock climbing route (e.g., when starting to descend a rock face), or an intermediate point between the base and peak locations along a rock climbing route.

Although the foregoing text sets forth a detailed description of numerous different embodiments, it should be understood that the detailed description is to be construed as exemplary only and does not describe every possible embodiment because describing every possible embodiment would be impractical, if not impossible. In light of the foregoing text, numerous alternative embodiments may be implemented, using either current technology or technology developed after the filing date of this patent application.

What is claimed is:
1. A rock climbing watch, comprising:
a location determining component configured to determine a current geographic location of the rock climbing watch;
a sensor array configured to measure an orientation of the rock climbing watch;
a memory configured to store rock climbing navigational data; and
a processor configured to:
calculate a first angle between a starting location and a first rock face location based upon the orientation of the rock climbing watch when the rock climbing watch is pointed from the starting location towards the first rock face location, and store the first angle as rock climbing navigational data.

2. The rock climbing watch of claim 1, wherein the processor is further configured to calculate a second angle between the first rock face location and a second rock face location based upon the orientation of the rock climbing watch when the rock climbing watch is pointed from the first rock face location towards the second rock face location and store the second angle as rock climbing navigational data.

3. The rock climbing watch of claim 2, wherein the sensor array is further configured to measure an elevation of the rock climbing watch, and wherein the processor is further configured to:
calculate a first distance between the starting location and the first rock face location based upon the first angle and a change in elevation of the rock climbing watch between the starting location and the first rock face location, calculate a second distance between the first rock face location and the second rock face location based upon the second angle and a change in elevation of the rock climbing watch between the first rock face location and the second rock face location, and store the first and the second distances as rock climbing navigational data.

4. The rock climbing watch of claim 1, wherein the processor is further operable to calculate a first angle between the first rock face location and the starting location based upon the orientation of the rock climbing watch when the rock climbing watch is pointed from the first rock face location towards the starting location, and determine a difference between the calculated first angle when the rock climbing watch is pointed from the first rock face location towards the starting location and the calculated first angle when the rock climbing watch is pointed from the starting location towards the first rock face location, store an indication in the memory that the first angle calculated between the starting location and the first rock face location made from the first rock face location is accurate if the determined difference is below an error threshold.

5. The rock climbing watch of claim 1, wherein the sensor array is further configured to measure a motion of the rock climbing watch, and wherein the processor is further configured, upon the rock climbing watch reaching the first rock face location, to associate a current geographic location of the rock climbing watch with the first rock face location when the motion of the rock climbing watch matches a predetermined motion profile.

6. The rock climbing watch of claim 1, wherein the sensor array is further configured to detect metallic objects within a threshold distance of the rock climbing watch, and wherein the processor is further configured, upon the rock climbing watch reaching the first rock face location, to associate a current geographic location of the rock climbing watch with the first rock face location when the sensor array detects that the rock climbing watch is within the threshold distance of a metallic bolt located at the first rock face location.

7. The rock climbing watch of claim 1, wherein the starting location is at least one of a base location at the bottom of a rock climb, an intermediate location of a rock climb, or a rock face location at the top of a rock climb.

8. The rock climbing watch of claim 1, wherein the memory includes a known geographic location for the starting location, and wherein the processor is further configured to determine, based on the known geographic location of the starting location and the calculated first angle, an estimated geographic location for the first rock face location.

9. The rock climbing watch of claim 8, wherein the processor is further configured to:

calculate a second angle between the first rock face location and a second rock face location based upon the orientation of the rock climbing watch when the rock climbing watch is pointed from the first rock face location towards the second rock face location, and determine, based on the estimated geographic location for the first rock face location and the calculated second angle, an estimated geographic location for the second rock face location.

10. The rock climbing watch of claim 1, further comprising:

a user interface configured to identify a user input indicating that the rock climbing watch is being pointed from the starting location towards the first rock face location.

11. A rock climbing watch, comprising:

a communication unit configured to receive rock climbing navigational data;

a memory configured to store the rock climbing navigational data, the rock climbing navigational data including a plurality of rock face locations and a plurality of rock climbing route segments for traversing a rock face, the plurality of rock face locations including a first and a second rock face location, and the plurality of rock climbing route segments indicating an angle and distance between each of the plurality of rock face locations;

a processor configured to receive an input indicating that the rock climbing watch is currently located at the first rock face location; and a watch face display configured to display a direction and a distance from the first rock face location to the second rock face location upon receipt of the input, the direction and distance being based upon an angle and a distance indicated by a rock climbing route segment from among the plurality of rock climbing route segments that spans the first and second rock face locations.

12. The rock climbing watch of claim 11, further comprising:

a sensor array configured to measure a motion of the rock climbing watch, and wherein the input indicating that the rock climbing watch is currently located at the first rock face location includes identification of the motion of the rock climbing watch matching a predetermined motion profile.

13. The rock climbing watch of claim 12, wherein the predetermined motion profile includes a dangling arm shakeout motion.

14. The rock climbing watch of claim 11, wherein the watch face display is further configured to graphically present the direction from the first rock face location to the second rock face location as an arrow in three-dimensional space.

15. The rock climbing watch of claim 11, wherein the watch face display is further configured to present the rock climbing route segment with the direction and the distance from the first rock face location to the second rock face location.

16. The rock climbing watch of claim 11, wherein the watch face display is further configured to present a grade associated with the rock climbing route segment, the grade being indicative of an accuracy of the angle between the first and the second rock face location received in the rock climbing navigational data.

17. The rock climbing watch of claim 11, further comprising:
   a sensor array configured to measure an orientation of the rock climbing watch, and
   wherein the processor is further configured to:
      calculate, and store in the memory, a first angle between a starting location and the first rock face location based upon the orientation of the rock climbing watch when the rock climbing watch is pointed from the starting location towards the first rock face location,
      determine a difference between the calculated first angle and the stored angle between the starting location and the first rock face location, and
      store an indication in the memory that the stored angle is inaccurate if the determined difference exceeds an error threshold.

18. The rock climbing watch of claim 17, wherein the processor is further configured to calculate a second angle between the first rock face location and the second rock face location based upon the orientation of the rock climbing watch when the rock climbing watch is pointed from the first rock face location towards the second rock face location.

19. The rock climbing watch of claim 18, wherein the sensor array is further configured to measure an elevation of the rock climbing watch, and
   wherein the processor is further configured to:
      calculate a first distance between the starting location and the first rock face location based upon the first angle and a change in elevation of the rock climbing watch between the starting location and the first rock face location, and
      calculate a second distance between the first rock face location and the second rock face location based upon the second angle and a change in elevation of the rock climbing watch between the first rock face location and the second rock face location.

20. The rock climbing watch of claim 17, wherein the starting location is at least one of a base location at the bottom of a rock climb, an intermediate location of a rock climb, or a rock face location at the top of a rock climb.

* * * * *